United States Patent [19]

Lin

[11] Patent Number: 4,985,661
[45] Date of Patent: Jan. 15, 1991

[54] UNINTERRUPTED DESK LAMP

[76] Inventor: Yuang-Chang Lin, No. 100, Shan Hsi Tung Wu Street, North District, Taichung, Taiwan

[21] Appl. No.: 413,027

[22] Filed: Sep. 27, 1989

[51] Int. Cl.⁵ .......................................... H05B 39/10
[52] U.S. Cl. ...................................... 315/87; 315/154; 362/20
[58] Field of Search ............... 315/87, 92, 154, 86; 362/20, 194, 228, 249, 254, 431, 395, 410, 415

[56] References Cited

U.S. PATENT DOCUMENTS

| | | | |
|---|---|---|---|
| 1,922,079 | 8/1933 | Dixon | 362/20 |
| 2,389,762 | 11/1945 | Burke | 362/20 |
| 3,582,708 | 6/1971 | Snyder | 315/92 |
| 3,694,692 | 9/1972 | Pressman | 315/92 |
| 4,099,095 | 7/1978 | Turner | 315/87 |
| 4,700,110 | 10/1987 | McNair | 315/87 |
| 4,802,065 | 1/1989 | Minter | 362/254 |

FOREIGN PATENT DOCUMENTS

| | | | |
|---|---|---|---|
| 0073575 | 6/1977 | Japan | 315/87 |
| 0073582 | 6/1977 | Japan | 315/87 |

Primary Examiner—Eugene R. Laroche
Assistant Examiner—Son Dinh
Attorney, Agent, or Firm—Varndell Legal Group

[57] ABSTRACT

This invention relates to an interrupted desk lamp generally comprised of a main lamp assembly and an auxiliary lamp assembly. The auxiliary lamp assembly is controlled by means of a photoresistor and an AC power failure lighting circuit to automatically turn on the lamp bulb to provide illumiantion during AC power failure and low intensity of ambient light. The auxiliary lamp assembly may be removed from the device for independent application to serve as an emergency lamp.

2 Claims, 3 Drawing Sheets

UNINTERRUPTED DESK LAMP

BACKGROUND OF THE INVENTION

The present invention relates to a kind of desk lamp and more particularly to the one which is commonly used as a regular illuminator as well as an emergency lamp.

Regular desk lamps, either lamp bulb or fluorescent tube type, are generally operated through AC power supply. These desk lamps will become useless when no AC power is available. In order to satisfy the demand to provide illumination during AC power failure, a variety of emergency lamps are put on the market. However, regular emergency lamps are heavy, tough and dull in outer appearance. They normally shall have to mount or hang on a wall or be positioned at a higher place. Therefore, regular emergency lamps are not practical for home use.

It is therefore, the main object of the present invention to provide such an uninterrupted desk lamp which can continuously provide illumination during AC power failure.

It is another object of the present invention to provide such an uninterrupted desk lamp of which the auxiliary lamp assembly can be flexibly removed from the device for independent application to serve as an emergency lamp.

Further objects and the advantages of the present invention will be understood from the following detailed description of the preferred embodiment of this invention referring to the annexed drawings.

DETAILED DESCRIPTION OF THE PREFERRED EMBODIMENTS

Figure 1:
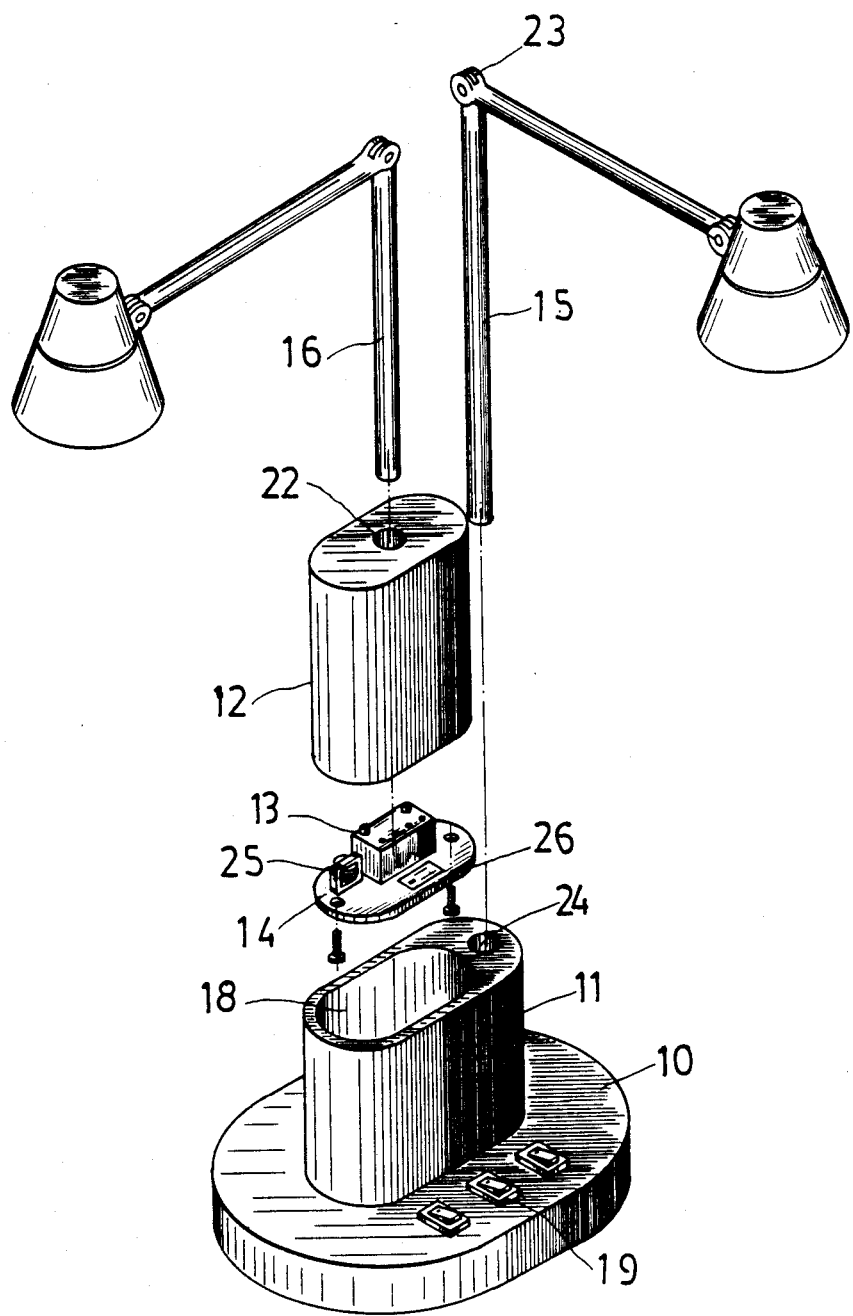
FIG. 1 is a perspective structural fragmentary view of an uninterrupted desk lamp embodying the present invention.

Turning now to the annexed drawings in detail, therein illustrated is a desk lamp embodying the present invention and generally comprised of a base (10), a main seat (11), an auxiliary seat (12), a battery (13), a bottom cover (14), a main lamp assembly (15) and an auxiliary lamp assembly (16). The main and auxiliary seats (11) and (12) are having holes (24) and (22) respectively made thereon for insertion therein of the main and auxiliary lamp assemblies (15) and (16) respectively. The bottom cover (14) which is connected to the auxiliary seat (12) at the bottom is having respectively mounted thereon the battery (13), a transformer (25) and a circuit board (26) to respectively provide the auxiliary lamp assembly (16) with DC power for emergency use during AC power failure and to regulate the intensity of light of the main lamp assembly (15). The auxiliary seat (12) is seated in the notch (18) of the main seat (11) with the terminals (not shown) of the bottom cover (14) connected to a power socket (20) which is mounted on the base (10). A light intensity control knob (17) is mounted on the outer wall surface of the main seat (11) and connected to a light intensity regulating circuit to regulate the intensity of light of the main lamp assembly (15), which control knob (17) also serves as a power control switch to control the power supply to the main and auxiliary lamp assemblies (15) and (16).

Figure 2:
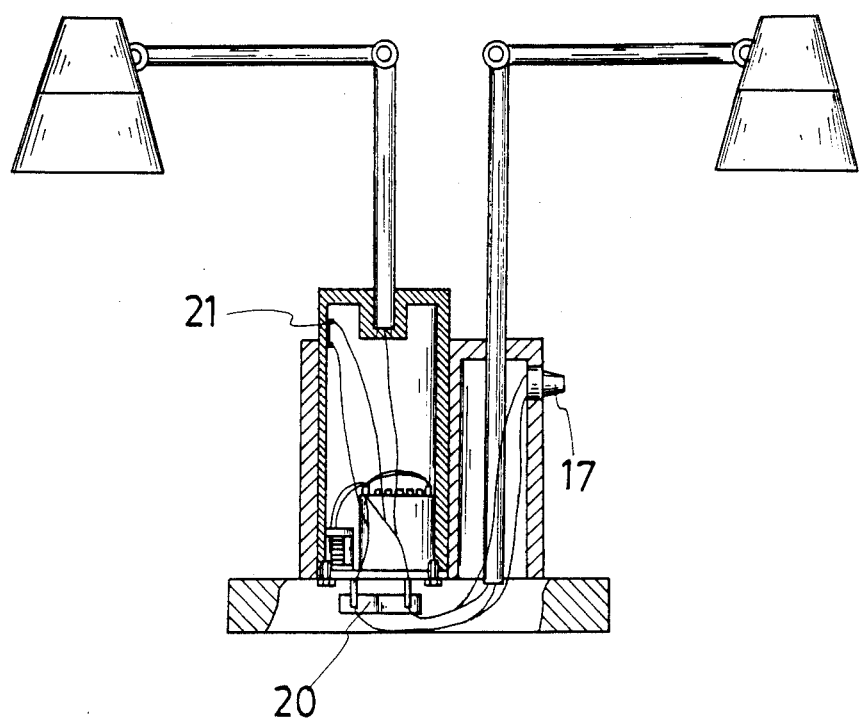
FIG. 2 is a schematic sectional assembly view of the present invention.
Figure 3:
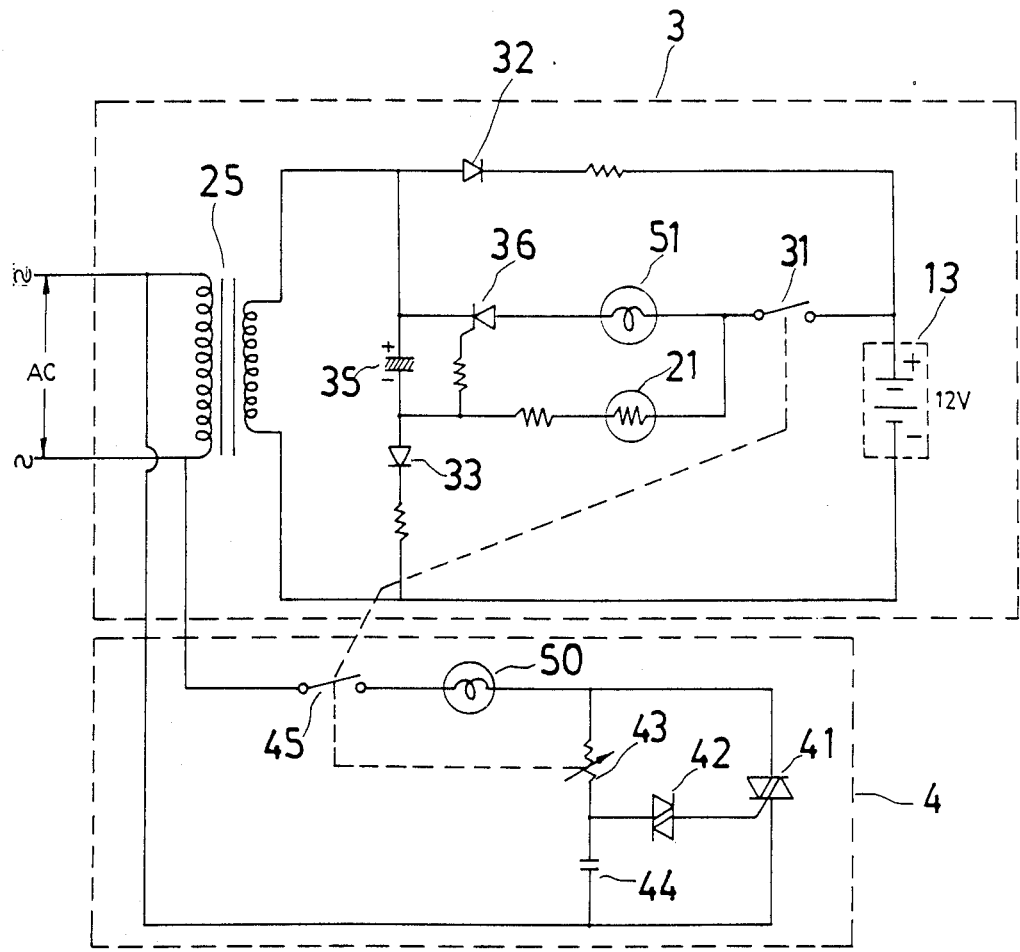
FIG. 3 is a circuit diagram of the present invention.

The main feature of the present invention is that the auxiliary lamp assembly will be automatically turned on during AC power failure. The main lamp assembly (15), the control knob (17) and the circuit board (26) form a regular lighting device through which outer AC power is connected to turn on the lamp bulb (50) (as shown in FIG. 3). During AC power failure, the battery (13) provides the auxiliary lamp assembly (16) with necessary working voltage to match with the operation of a photoresistor (21) which is mounted on the inner sidewall of the auxiliary seat (12) (as shown in FIG. 2). When power is switched on, the circuit board immediately detects if any AC power failure, and the photoresistor (21) immediately detects the intensity of light. If ambient light intensity of light is below a certain range (too dark), the lamp bulb (51) of the auxiliary lamp assembly (16) will be immediately turned on to provide sufficient light. According to the present invention, the photoresistor (21) must be mounted on a position far from light source to prevent from erroneous operation.

The circuit structure of the present invention, as illustrated in FIG. 3, is generally comprised of a power failure lighting circuit (3) and a light intensity regulating circuit (4). The light intensity regulating circuit (4) forms a phase-shifting control and is generally comprised of an AC silicon controller (41), a bi-directional diode (42), a variable resistor (43), capacitor (44) and a power switch (45). The lamp bulb (50) of the main lamp assembly (15) is series-connected to the phase-shifting control of the light intensity regulating circuit (4). Through the variation of the resistance of the variable resistor (43), the triggering angle of the AC silicon controller (41) is adjusted to correspondingly control the power rating to the lamp bulb (50) of the main lamp assembly (15). Therefore, the light intensity can be properly adjusted according to requirement. When the variable resistor (43) is turned to the upper or lower limit, the power switch (45) is turned on or off accordingly.

The power failure lighting circuit (3) is generally comprised of the transformer (25), the battery (13), the photoresistor (21), and a silicon controlled rectifier (36). The transformer (25) which drops the voltage of AC power supply is connected through a rectifying diode (32) to the positive terminal of the battery (13) to provide a semiwave rectifying-charging circuit to charge the battery (13). The secondary coil of the transformer (25) is bridged with a capacitor (35) series connected with a diode (33). The both ends of the capacitor (35) are respectively connected to the negative end and the gate of the silicon controlled rectifier (36). After having been respectively connected to the lamp bulb (51) of the auxiliary lamp assembly ((16) and the photoresistor (21) through respective series connection, the positive end and the gate of the silicon controlled rectifier (36) are parallely connected through a power switch (31), which is linking up with the power switch (45), to further connect to the positive terminal of the battery (13).

When the power switches (45) and (31) are switched on under normal AC power supply, the secondary terminal of the transformer (25) produces a voltage to charge the capacitor (35) through the diode (33), i.e. a positive voltage is produced between the negative end and the gate of the silicon controlled rectifier (36) to bias-off the silicon controlled rectifier (36). Therefore, the power supply is cut off from the lamp bulb (51) of the auxiliary lamp assembly (16). During AC power failure, the bias voltage at the silicon controlled rectifier (36) is disappeared because no electric charge is existed at the both ends of the capacitor (35). Therefore, the DC power supply from the battery (13) is sent through the passage formed of the switch (31), the photoresistor (21), the silicon controlled rectifier (36) and the transformer (25) to trigger on the silicon controlled rectifier (36) so as to further turn on the lamp bulb (51) of the auxiliary lamp assembly (16).

According to the present invention, the photoresistor (21) is an element which provides positive resistance, i.e. the resistance produced is in direct proportion to the ambient light intensity. Therefore, the photoresistor (21) detects the ambient light intensity around the present desk lamp. Due to the direct resistance property of the photoresistor (21), the silicon controlled rectifier (36) will not be triggered during AC power failure when ambient light intensity is high. Through this arrangement, the lamp bulb (51) will not be turned on in broad daylight. At night, the resistance at the photoresistor (21) becomes low, therefore, a bias voltage is provided with the photoresistor (21) to automatically turn on the lamp bulb (51) of the auxiliary lamp assembly (16) during AC power failure.

Further, the auxiliary seat (12) may be removed from the main seat (11) to let the auxiliary lamp assembly (16) serve as an emergency lamp to provide illumination in the dark.

I claim:
1. An uninterrupted desk lamp, including:
   a base;
   a main seat upstanding from said base, comprising a notch for setting therein of an auxiliary seat;
   an auxiliary seat being seated in said notch of said main seat;
   a AC power failure lighting circuit comprised of a battery, a transformer, and a circuit board;
   a main lamp assembly being mounted on said main seat and comprising a main lamp bulb;
   an auxiliary lamp assembly being mounted on said auxiliary seat and comprising an auxiliary lamp bulb, said auxiliary lamp bulb being connected with said power failure lighting circuit; and
   a photoresistor being mounted on the inner wall surface of said main seat;
   characterized in that said transformer is connected through a rectifying diode to the positive terminal of said battery to provide a semiwave rectifying-charging circuit to charge said battery, said AC power failure lighting circuit comprising a secondary coil bridged with a capacitor series connected with another diode, said capacitor having its both ends respectively connected to the negative end and the gate of a silicon controlled rectifier, said silicon controlled rectifier having its positive end series connected to said auxiliary lamp bulb to further connect to said battery and having its gate connected to the positive terminal of the battery, said photoresistor being to form a bias voltage circuit with both ends respectively connected to said battery and the gate of said silicon controlled rectifier to detect ambient light intensity so as to turn on said auxiliary lamp bulb of said auxiliary lamp assembly, through the operation of said AC power failure lighting circuit, during AC power failure under low ambient light intensity.

2. The uninterrupted desk lamp as set forth in claim 1, wherein said auxiliary seat may be removed from said main seat to let said auxiliary lamp assembly serve as an independently emergency lamp for flexible application.

* * * * *